United States Patent
Smith (10) Patent No.: US 12,260,217 B2
(45) Date of Patent: Mar. 25, 2025

(54) USING RENAMED REGISTERS TO SUPPORT MULTIPLE VSET{I}VL{I} INSTRUCTIONS

(71) Applicant: SiFive, Inc., San Mateo, CA (US)

(72) Inventor: Josh Smith, San Francisco, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/115,970

(22) Filed: Mar. 1, 2023

(65) Prior Publication Data
US 2024/0184583 A1 Jun. 6, 2024

Related U.S. Application Data

(60) Provisional application No. 63/429,681, filed on Dec. 2, 2022.

(51) Int. Cl.
*G06F 9/30* (2018.01)
*G06F 9/38* (2018.01)

(52) U.S. Cl.
CPC ...... *G06F 9/30101* (2013.01); *G06F 9/30145* (2013.01); *G06F 9/384* (2013.01); *G06F 9/3856* (2023.08)

(58) Field of Classification Search
CPC .................................................. G06F 9/30101
See application file for complete search history.

(56) References Cited

U.S. PATENT DOCUMENTS

| | | | | |
|---|---|---|---|---|
| 5,872,987 A | * | 2/1999 | Wade | G06F 21/52 712/3 |
| 2004/0073635 A1 | * | 4/2004 | Narad | G06F 9/5016 709/221 |
| 2013/0305020 A1 | * | 11/2013 | Valentine | H01L 29/7831 712/222 |
| 2013/0326199 A1 | * | 12/2013 | Magklis | G06F 9/30087 712/222 |
| 2014/0122843 A1 | * | 5/2014 | Henry | G06F 9/30196 712/225 |
| 2019/0213322 A1 | * | 7/2019 | Dehon | G06F 9/4401 |
| 2019/0235867 A1 | * | 8/2019 | Jaffari | G06F 7/49947 |
| 2022/0357955 A1 | * | 11/2022 | Favor | G06F 9/3834 |

* cited by examiner

*Primary Examiner* — Michael J Metzger
(74) *Attorney, Agent, or Firm* — Kilpatrick Townsend & Stockton LLP (57) ABSTRACT

A method for renaming architectural register, such as control and status register (CSR), is disclosed. The method includes decoding an instruction for updating CSR, updating the CSR based on a respective instruction of the one or more instructions, allocating a unique tag to the instruction in pipeline, and writing the tag into a mapping table for renaming the CSR. The tag can identify the CSR included in the instruction or the updated values of the CSR. The tag can be associated with a unique value. Moreover, the method can employ a First In, First Out (FIFO) queuing technique and virtual bits.

16 Claims, 6 Drawing Sheets

USING RENAMED REGISTERS TO SUPPORT MULTIPLE VSET{I}VL{I} INSTRUCTIONS

CROSS REFERENCE TO RELATED APPLICATION

This application claims priority to and the benefit of U.S. Patent Application Ser. No. 63/429,681, filed on Dec. 2, 2022, the entire disclosure of which is hereby incorporated by reference.

TECHNICAL FIELD

This disclosure relates generally to integrated circuits and, more specifically, to using renamed registers for vector extension support.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. Control and Status Register (CSRs) are registers that are used to store information about instructions received from machines. In most processors, the CSRs are not renamed and there is only one architectural value for the CSR which every instruction in the pipeline sees. This is because the CSR values very infrequently change and renaming adds extra hardware complexity and cost.

The RISC-V Vector extension defines two system registers (CSRs): Vector Type Register (vtype), and Vector Length Register (vl). In most RISC-V processors, even with speculative execution and register renaming, the CSRs are not renamed and there is only one architectural value for the CSR which every instruction in the pipeline sees. This is because the CSR values very infrequently change. However, vtype and vl, vector instructions may change these frequently. So, to increase performance, these two specific CSRs are renamed to allow different instructions in the pipeline to see different values of vtype and vl. Described are methods for renaming and tracking these register values.

Figure 1:
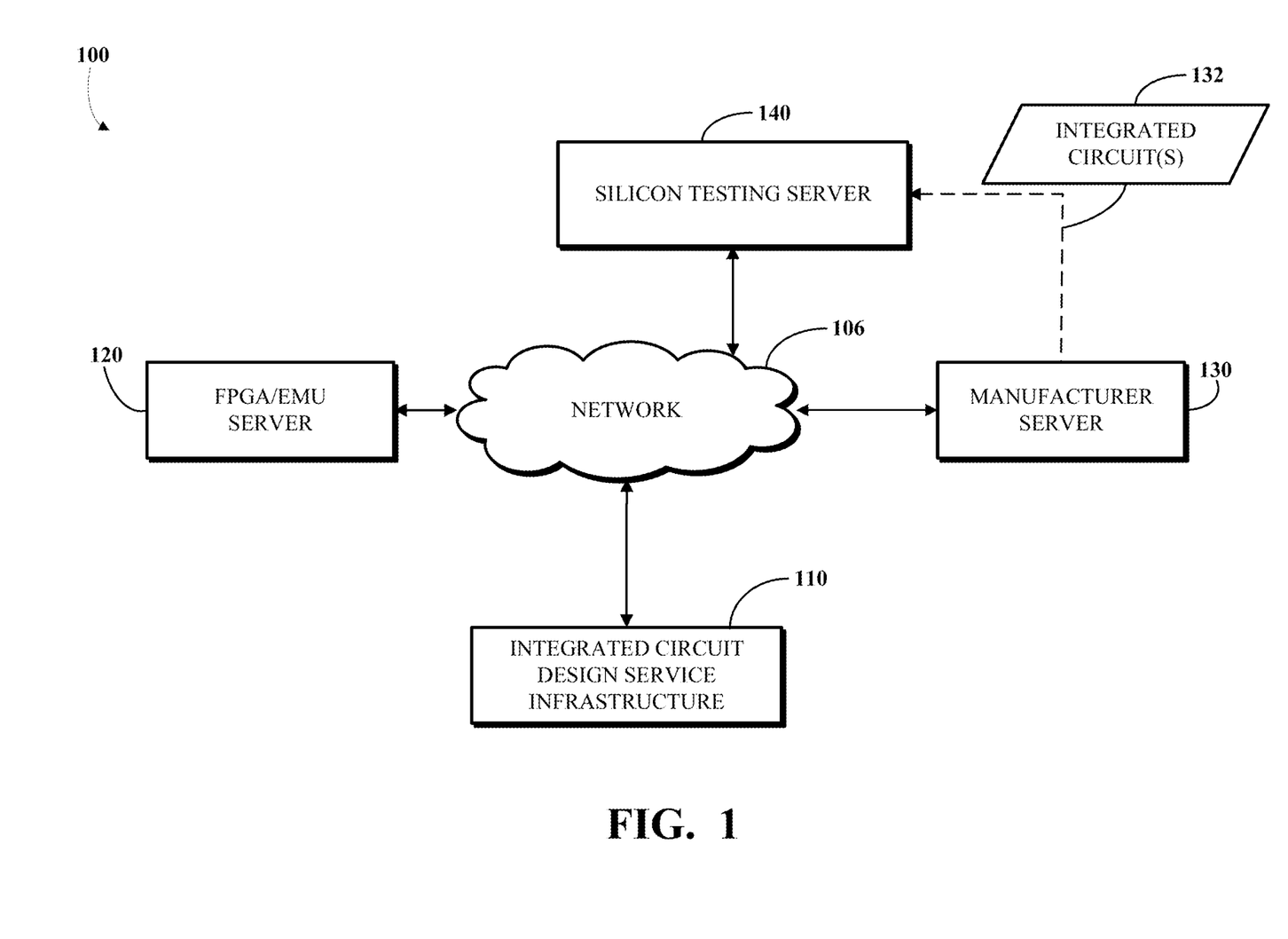
FIG. 1 is a block diagram of an example of a system for facilitating generation and manufacture of integrated circuits.

To describe some implementations in greater detail, reference is first made to examples of hardware and software structures used to implement a system including components that may rename a control and status register (CSR). FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIG. 3.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
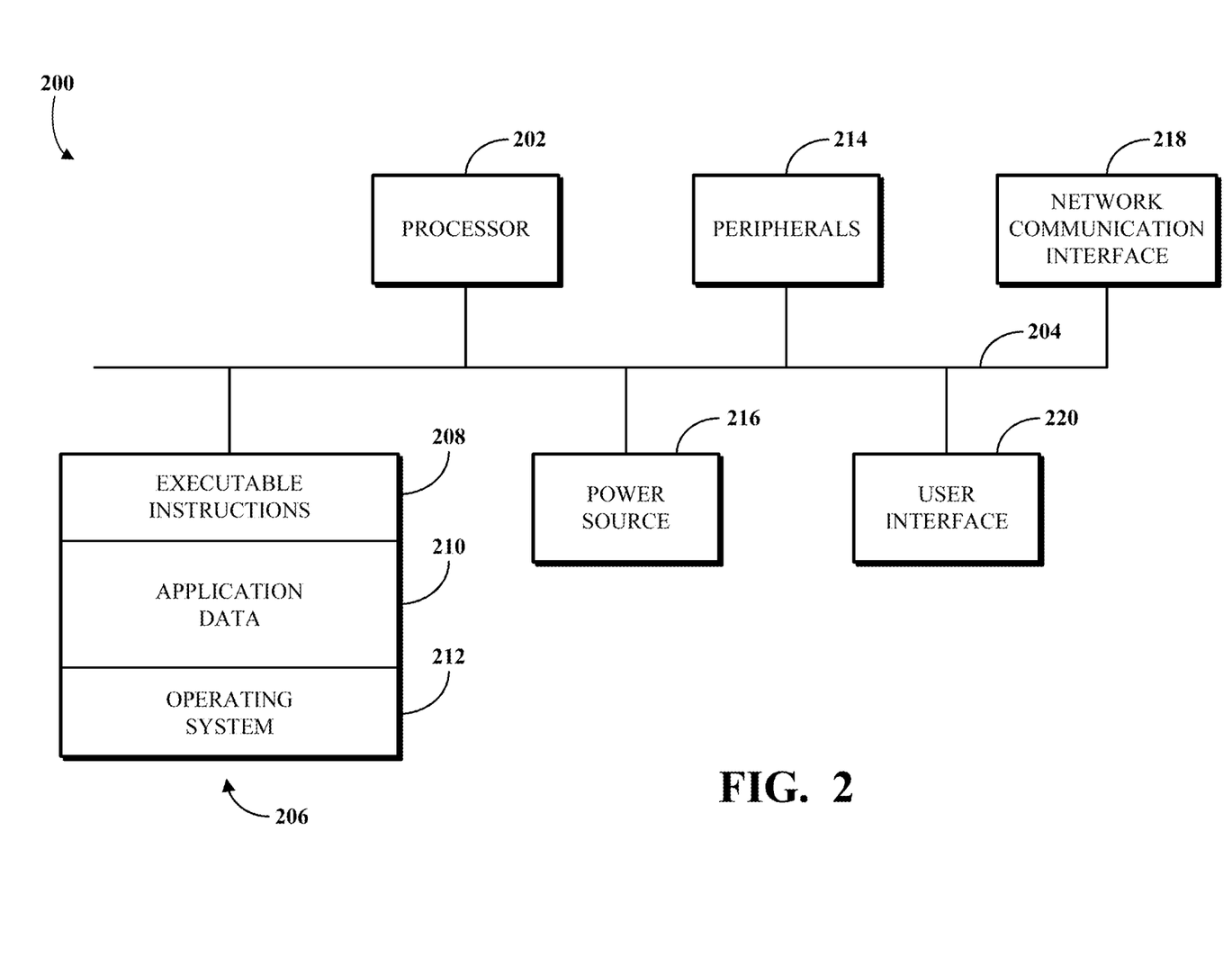
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIG. 3.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
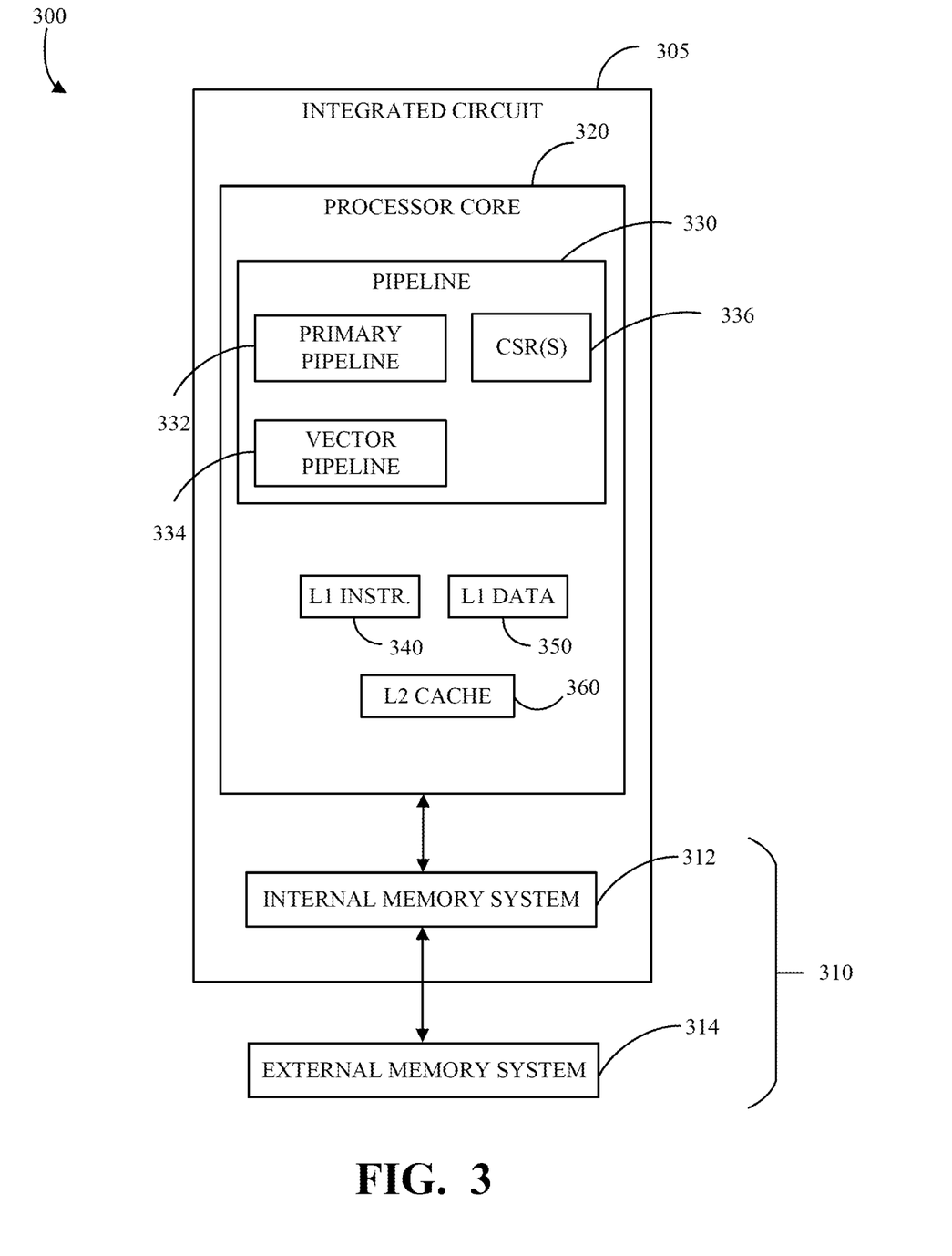
FIG. 3 is a block diagram of an example of an integrated circuit with a primary pipeline and a vector pipeline.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline 332, a vector pipeline 334, and control and status registers or configuration status registers 336 (collectively "control and status registers" or "CSR(s)"). The primary pipeline 332 and the vector pipeline 334 each have separate decode units, rename units, dispatch units, execution units, physical and/or virtual registers, caches, queues, data paths, and/or other logic associated with instruction flow. In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

The RISC-V Vector extension defines two new system registers (CSRs): vtype, and vl. In most RISC-V processors, even with speculative execution and register renaming, the CSRs are not renamed and there is only one architectural value for the CSR which every instruction in the pipeline sees. This is because the CSR values very infrequently change and renaming adds extra hardware complexity and cost. However, with vtype and vl, vector instructions may change these frequently. So, to enhance performance, those two specific CSRs are renamed to allow different instructions in the pipeline to see different values of vtype and vl.

Figure 4:
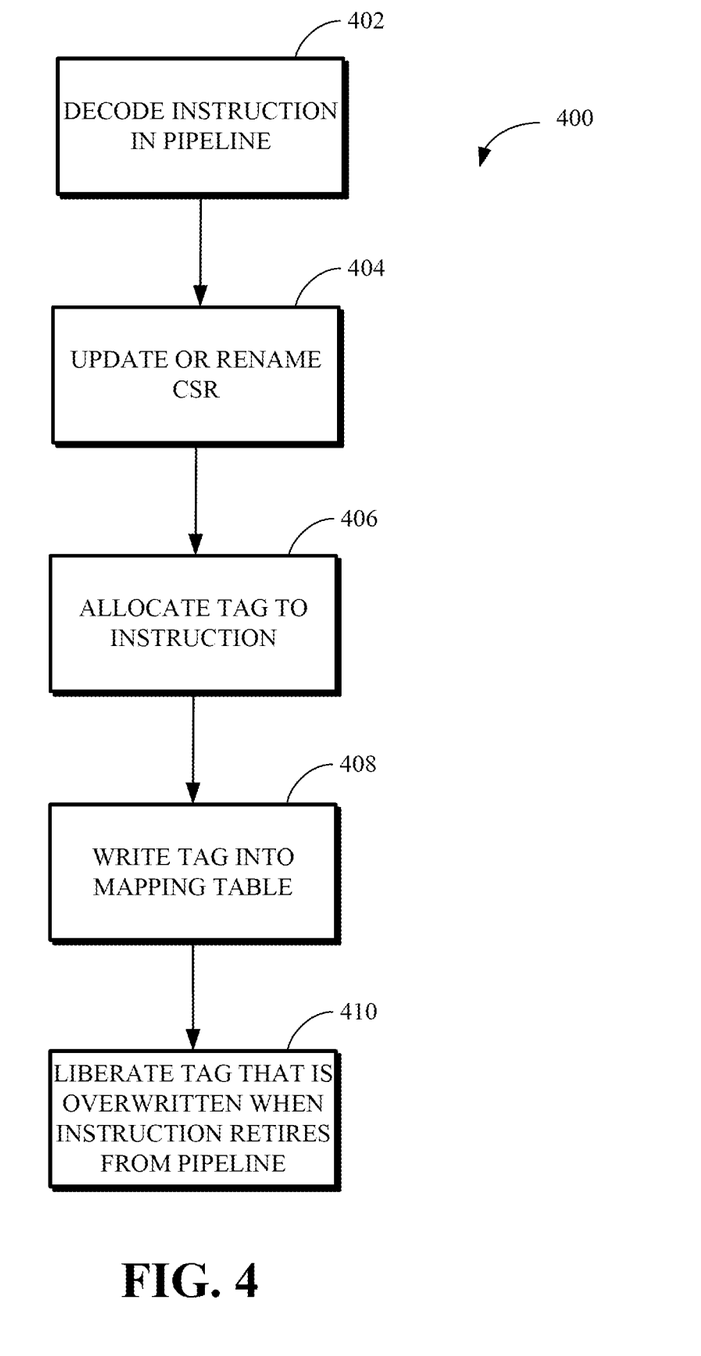
FIG. 4 is a flowchart diagram of a method of renaming a control and status register (CSR) in accordance with implementations of this disclosure.

FIG. 4 is a flowchart diagram of a method 400 of renaming a control and status register (CSR) in accordance with implementations of this disclosure. The method 400 can be implemented, for example, by a processor, such as the processor 202 or the processor core 320. The processor may include circuitry for executing instructions, such as one or more pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used.

At 402, the method 400 decodes one or more instructions in the one or more pipelines. The one or more instructions may include instructions to update or rename a control and status register (CSR). The CSR may be, comprise, or include one or more CSR entries or different types of system registers (or CSRs) which include vtype and/or vl. The vtype and vl are the CSRs that may be defined by the RISC-V Vector extension. The system registers (e.g., CSRs, CSR entries, register entry), such as vtype and vl, may be renamed to allow different instructions in the pipeline to see different values of vtype and vl.

At 404, the method 400 may update or rename the CSR. The CSR may be updated or renamed based on one or more instructions. In some implementations, the system registers or CSRs that comprise the CSR may be updated by a same type of instruction. For example, vtype and vl may be updated or renamed by one type of instruction (e.g., vset instruction). In such case, the vtype and vl may be updated or renamed as separate units (e.g., separate entries) or a combined single unit (e.g., single entry). In another example, the only one of the vtype or the vl may be updated or renamed.

In some implementations, the system registers or different type of CSRs which can be updated by the same type of instruction may be updated or renamed as one combined unit. For example, when the vtype and vl are updated or renamed, they may be updated or renamed as separate units or one combined unit.

At 406, the method 400 may allocate one or more tags to a respective instruction in the one or more pipelines that update or rename the CSR. In some implementations, the processor may allocate one or more tags prior to updating or renaming the CSR. For example, the processor may first detect whether the one or more instructions include the respective instruction that updates or renames the CSR, and when the respective instruction is detected, a tag may be allocated to the respective instruction or an instruction that contains the respective instruction. In some implementations, the processor may allocate one or more tags during or after updating (e.g., renaming) the CSR.

In some implementations, an instruction that updates or renames the CSR may also include instruction to allocate the tag to itself prior to, during, and/or after the CSR is updated or renamed.

At 408, the method 400 may write (e.g., overwrite) one or more tags into a mapping table. The mapping table may be indexed by an architectural register number or identifier, and value held in the mapping table may be or associated with the one or more tags for the architectural register number or identifier. For example, prior to writing one or more tags, the mapping table may already hold tag A associated with a certain CSR and the respective instruction in the one or more pipelines that update or rename such CSR may allocate or be allocated a tag B and may write tag B to the mapping table. Moreover, when the writing occurs, the tag that was overwritten (e.g., tag A) is remembered.

As such, every instruction in the pipeline which updates the same architectural register may have a unique tag which can point to a different value.

In some implementations, the architectural register number or identifier may correspond to a single CSR. For example, the architectural register number or identifier may correspond to vl or vtype.

In some implementations, there may be more than one architectural register numbers or identifiers, which may correspond to more than one CSRs that may be updated or renamed by a same instruction. For example, the architectural register numbers or identifiers may be or include both vl and vtype, which may be updated or renamed by a same instruction.

In some implementations, a single architectural register number or identifier may correspond to both vl and vtype. In some implementations, value of the tag or value associated with the tag may be a single entry (e.g., combined entry) that represents or is associated with more than one CSRs (or architectural register numbers or identifiers) that may be updated or renamed by a same instruction. For example, value of the tag or value associated with the tag may be a single entry for both the vl and the vtype.

In some implementations, value of the tag or value associated with the tag may be a single entry that represents or is associated with a single CSR (or architectural register number or identifier).

At 410, the method 400 may liberate or release the overwritten tag (for the CSR) from the mapping table when the respective instruction that overwrote a respective tag retires from the pipeline. For example, assuming that the mapping table already held tag A associated with a certain CSR and the respective instruction in the one or more pipelines that update or rename such CSR with allocated tag B wrote tag B to the mapping table, the tag that was overwritten (tag A in this case) is remembered and liberated from the mapping table.

In some implementations, when respective instruction (e.g., vset instruction) that overwrote the tag retires from the pipeline, overwritten tag in the mapping table becomes available again for a new instruction.

The overwritten tag may be liberated or released out of program order only if there are multiple entries in the mapping table. In such case, the availability of tags may be tracked through a searching tool or a structure called a Free List.

When more than one CSRs, such as vtype and vl together, are renamed as one combined unit, then the mapping table may be reduced to a single entry as described above. Since the mapping table can be reduced to the single entry, overwritten tags associated with more than one CSRs (e.g., vtype and vl) in the single entry may be liberated or released in a program order. Moreover, when the overwritten tags are liberated or released in the program order, then the searching tool or the structure Free List is not needed to track the availability of tags.

As such, the method 400 for renaming the architectural register (e.g., vl and vtype of CSRs) may allow different instructions in the pipeline to see different values of architectural registers or CSRs (e.g., vtype and vl).

Figure 5:
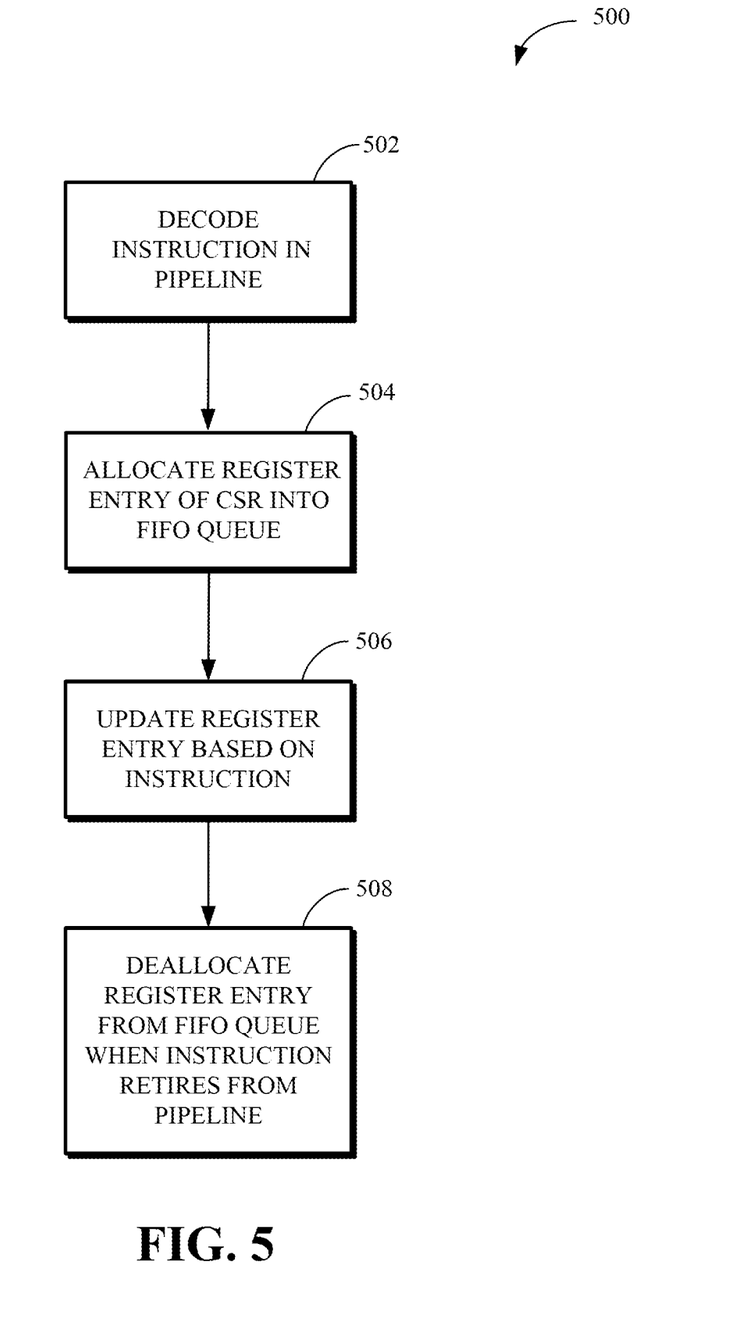
FIG. 5 is a flowchart diagram of a method of renaming a control and status register (CSR) using a First In, First Out (FIFO) mechanism in accordance with implementations of this disclosure.

FIG. 5 is a flowchart diagram of a method 500 of renaming a control and status register (CSR) using a First In, First Out (FIFO) mechanism in accordance with implementations of this disclosure. The method 500 can be implemented, for example, by a processor, such as the processor 202 or the processor core 320. The processor may include circuitry for executing instructions, such as one or more pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used. Moreover, the method 500 may be combined with the method 400 to enhance the efficiency of operation, reduce stalls at decode in pipelines, allow more instructions to enter the pipeline, allow different instructions in the pipeline to see different values of vtype and vl, and/or to satisfy any other appropriate reasons in accordance with implementations of this disclosure.

At 502, the method 500 decodes one or more instructions in the one or more pipelines. The one or more instructions may include instructions to update or rename a control and status register (CSR). The CSR may be, comprise, or include different types of system registers (or CSRs) which include vtype and/or vl. The vtype and vl may be defined by the RISC-V Vector extension. The system registers (or CSRs), such as vtype and vl, may be renamed to allow different instructions in the pipeline to see different values of vtype and vl.

At 504, the method 500 may allocate CSR entry (or register entry of the CSR) into a FIFO queue. In some implementations, every instruction that updates or renames the CSR (e.g., vset instruction which updates or renames vtype and vl) may allocate an entry in the FIFO queue after decode. For example, the allocation of the CSR entry to the FIFO queue may be managed by an allocation pointer, which may point to the next entry to be allocated to the FIFO queue. In some implementations, the instructions (e.g., vset instructions) may be allocated to or allocated to the FIFO queue (e.g., physical entries in the FIFO).

At 506, the method 500 may update or rename the CSR entry based on the respective instruction (e.g., vset instruction). For example, CSR (e.g., one or more CSR entries) may be updated or renamed based on one or more instructions. In some implementations, the system registers or CSRs may be updated by a same type of instruction. For example, vtype and vl may be updated or renamed by one type of instruction (e.g., vset instruction). In such case, the vtype and vl may be updated or renamed as separate units (e.g., separate entries) or a combined single unit (e.g., single entry). In another example, the only one of the vtype or the vl may be updated or renamed.

In some implementations, the system registers or different type of CSRs which can be updated by the same type of instruction may be updated or renamed as one combined unit. For example, when the vtype and vl are updated or renamed, they may be updated or renamed as separate units or one combined unit.

At 508, the method 500 may deallocate register entry from the FIFO queue when the instruction retires from the pipeline. For example, deallocation of the CSR entry from the FIFO queue may be managed by a retirement pointer, which may point to the next entry to be retried from the FIFO queue.

Figure 6:
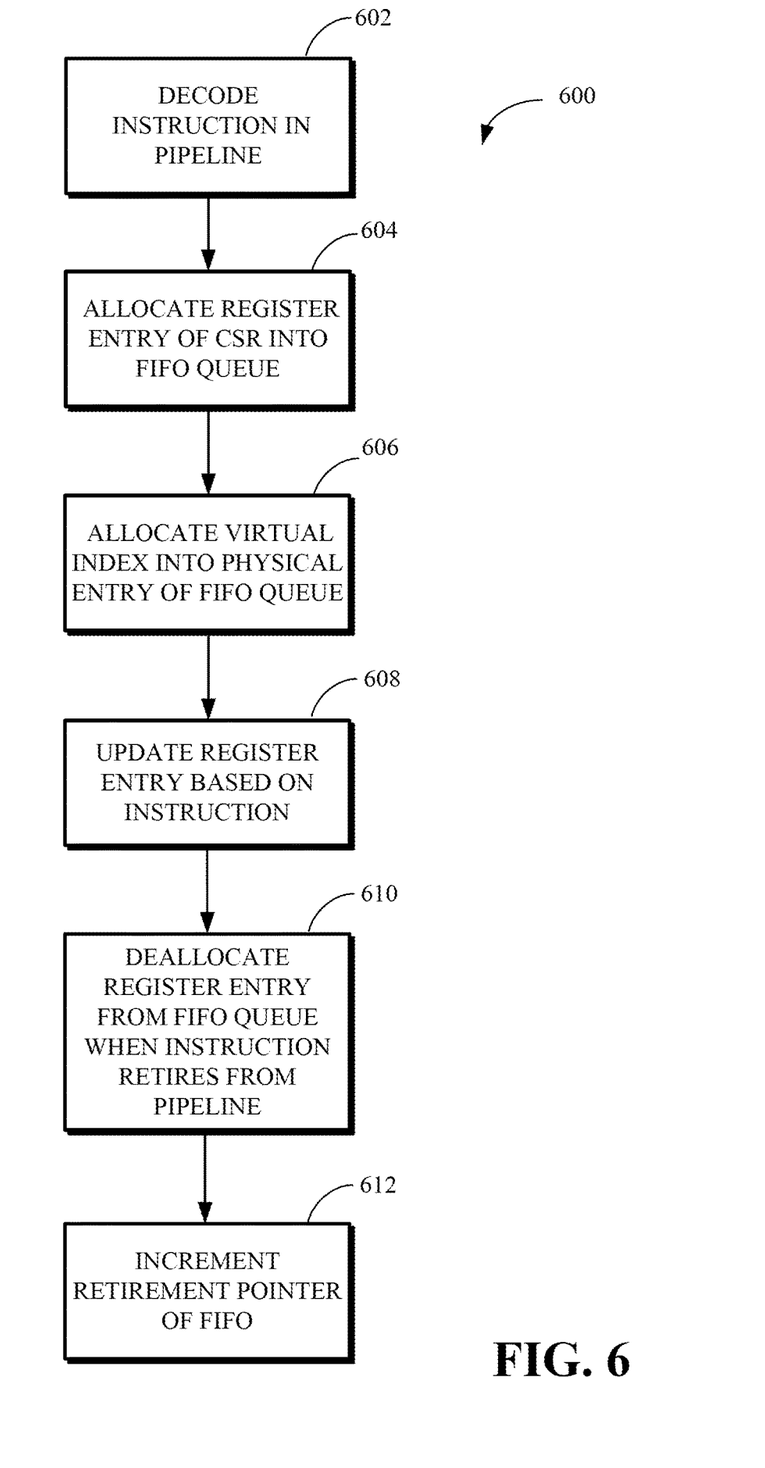
FIG. 6 is a flowchart diagram of a method of renaming a control and status register (CSR) using a First In, First Out (FIFO) mechanism and virtual and physical FIFO entries in accordance with implementations of this disclosure.

FIG. 6 is a flowchart diagram of a method 600 of renaming a control and status register (CSR) using a First In, First Out (FIFO) mechanism and virtual and physical FIFO entries in accordance with implementations of this disclosure. The method 600 can be implemented, for example, by a processor, such as the processor 202 or the processor core 320. The processor may include circuitry for executing instructions, such as one or more pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used. Moreover, the method 600 may be combined with the method 400 and/or the method 500 to enhance the efficiency of operation, reduce stalls at decode in pipelines, allow more instructions to enter the pipeline, allow different instructions in the pipeline to see different values of vtype and vl, and/or to satisfy any other appropriate reasons in accordance with implementations of this disclosure.

At 602, the method 600 decodes instructions in pipeline. The technique used at 602 can be the same as described with regards to step 402 of the method 400 or step 502 of the method 500, so the technique is not repeatedly mentioned here.

At 604, the method 600 may allocate CSR entry (or register entry of the CSR) into a FIFO queue. The technique used at 604 can be the same as described with regards to step 504 of the method 500, so the technique is not repeatedly mentioned here.

At 606, the method 600 allocates one or more virtual index (e.g., virtual FIFO entry number) to one or more physical entries of the FIFO queue, or to the FIFO queue. The physical entries of the FIFO queue (or physical FIFO entries) may correspond to the number of entries implemented in hardware. For example, there may be 8 physical entries with physical index from 0 to 7, and each instruction may be allocated to or allocated a one physical entry. Further, when one or more virtual bits (e.g., extra index bit, extra color bit, color bit, color) are allocated or indexed to the FIFO queue or the physical entries of the FIFO queue, there may by resulting virtual FIFO entries with virtual index for corresponding FIFO entries. The number of virtual FIFO entries can be defined by number of virtual bits (e.g., extra index bit, extra color bit, color bit, color) that are allocated to the FIFO queue.

In some implementations, based on number of virtual bits allocated to the FIFO queue (or physical entries of the FIFO queue), one or more virtual FIFO entries may be assigned or mapped to one physical FIFO entry of the physical FIFO entries. For example, assuming that there are 8 physical FIFO entries (or physical FIFO entry slots) with physical index 0, 1, 2, 3, 4, 5, 6, and 7, and that 3 index bits are required to map to the physical index, with 1 virtual bit (e.g., 1 extra color bit), 16 virtual entries (with virtual index from 0 to 15) may map into the 8 physical entries or physical index from 0 to 7. In such case, virtual index 0 and 8 can map to the physical index 0, virtual index 1 and 9 can map to the physical index 1, virtual index 2 and 10 can map to the physical index 2, virtual index 3 and 11 can map to the physical index 3, virtual index 4 and 12 can map to the physical index 4, the virtual index 5 and 13 can map to the physical index 5, the virtual index 6 and 14 can map to the physical index 6, and the virtual index 7 and 15 can map to the physical index 7. When there are 2 extra color bits, 32 virtual entries may map into the 8 physical entries. For example, the virtual index 0, 8, 16, and 24 can map into the physical index 0, the virtual index 1, 9, 17, and 25 can map into the physical index 1, and so forth. Even though examples are shown with only 1 and 2 virtual bits (e.g., extra color bits), there may be more than 2 virtual bits allocated to the FIFO queue or the physical entries of the FIFO queue.

By assigning or mapping more than one virtual entries (and thus virtual index) to one or more physical entries, one or more instructions (e.g., vset instructions) may be allocated to or allocated the virtual FIFO entries. For example, multiple vset instructions in the pipeline may map into same one physical FIFO entry. So in the example with 8 physical entries and 16 virtual entries, instead of stalling decode after 8 instructions (e.g., vset instructions) have decoded (but not yet retired from the pipeline), stalling can happen after 16 instructions (e.g., vset instructions) have decoded. That is, virtual indexing may reduce the number of stalls seen at decode and may allow more instructions to enter the pipeline, and thus enhance performance.

In some implementations, one or more instructions may be allocate CSR entries into the virtual FIFO entries. For example, multiple vset instructions may allocate vl, vtype, or vl and vtype combined entries into the virtual FIFO entries such that they may be updated or renamed.

In some implementations, the allocation of the instruction (or the CSR entry) to the FIFO queue may be managed by an allocation pointer, which may point to the next entry to be allocated to the FIFO queue. Moreover, deallocation of the instruction (or the CSR entry) may be managed by a retirement pointer to point to the next entry or instruction to be retired.

In some implementations, determining which virtual bit index number (e.g., virtual bit 1 or virtual bit 2 of the virtual bits, color bit 1 or color bit 2 of the color bits) can use or be allocated to the given physical index X of the physical entry may include employing a method of splitting the retirement pointer into a physical index and virtual bit index. For example, if the retire pointer's virtual index number (e.g., FIFO virtual index number) is less than or equal to the physical index number X, then the retire pointer's current virtual bit number may use the given physical index X. Next, if the retire pointer's virtual FIFO index number is greater than X, then a virtual bit index number may be increased in an increment of 1 from the current retire's pointer's virtual bit index number to determine which virtual bit index may use, mapped to, or allocated to the physical index number X.

Accordingly, for a given instruction (e.g., vset instruction) and its allocated virtual index, at least some conditions where the instruction has to stall can be determined due to unavailability of required physical FIFO entry. Given the retirement pointer's physical index (denoted as RPI) and color (denoted as RC), and the instruction's allocated physical index (denoted as SPI) and color (denoted as SC), the instruction is allowed to use its physical entry if $$(RC=SC) \text{ and } (SPI \geq RPI) \text{ or} \qquad \text{Equation (1)}$$

$$(SC=RC+1) \text{ and } (SPI<RPI) \qquad \text{Equation (2)}$$

As an example, assuming that 16 vset instructions have been decoded, virtual index 0-15 have been allocated, and no vset instruction has been issued yet, the retire pointer will be 0, meaning the virtual bit index number (or color bit number) is also 0. This implies that the instruction with virtual index 0 is allowed to use physical index 0. Once the instruction with virtual index 0 executed and retires, the retirement pointer will be incremented to 1. This implies that the instruction with virtual bit index (e.g., color bit number) 1 and corresponding virtual index 8 can use the physical index 0, and become unstalled.

At 608, the method 600 may update or rename the CSR entry based on the respective instruction (e.g., vset instruction). For example, CSR (e.g., one or more CSR entries) may be updated or renamed based on one or more instructions. The technique used at 608 can be the same as described with regards to step 508 of the method 500, so the technique is not repeatedly mentioned here.

At 610, the method 600 may deallocate register entry or instructions from the FIFO queue when the instruction retires from the pipeline. For example, deallocation of the CSR entry from the FIFO queue may be managed by a retirement pointer (as described above), which may point to the next entry to be retried from the FIFO queue.

At 612, the method 600 may increment the retirement pointer as described above with respect to step 606. For example, after deallocation, Once the instruction with virtual index 0 executed and retires, the retirement pointer will be incremented to 1. For example, the instruction with virtual bit index (e.g., color bit number) 0 which was allocated to or used the physical index 0 may retire, and the retirement pointer may now point to virtual bit index 1 and corresponding virtual index 8 can use the physical index 0, and become unstalled.

Accordingly, primary concern is that in many processors, updates to architectural registers (e.g., CSRs) with side effects may cause some processors to flush the entire pipeline after the architectural register update (e.g., CSR update) and continue refetching from the instruction immediately after the update, and the updates may cause younger instructions to stall in decode until the update to the architectural register (e.g., CSR) occurs. Such stalling or flushing behavior can significantly reduce performance. According to the disclosure herein, improvements to the performance may achieved through renaming the architectural register (e.g., vl and vtype of CSRs) to allow different instructions in the pipeline to see different values of vtype and vl. Moreover, employment of FIFO queue and virtual indexing can be used to further enhance the performance.

The described methods and systems for using renamed registers to support multiple vector instructions includes a method for renaming architectural register. The method includes decoding one or more instructions in a pipeline, wherein the one or more instructions update a control and status register (CSR), updating values in the CSR based on a respective instruction of the one or more instructions, allocating one or more tags to the respective instruction in the pipeline, where the one or more tags identify the CSR included in or associated with the one or more instructions or the updated values of the CSR, and where each of the one or more tags is associated with a unique value, and writing the tags into a mapping table for renaming the CSR.

In implementations, the CSR includes a vector type register (vtype) and a vector length register (vl). In implementations, the method further includes when a respective instruction of the one or more instructions that overwrote a respective tag retires from the pipeline, liberating the respective tag. In implementations, the respective tag is liberated in an order that is different from an allocated order. In implementations, the one or more types of instructions are of a same type instruction and the vtype and the vl are updated by the same type instruction. In implementations, the writing the tags into a mapping table for renaming the CSR includes writing the vtype and the vl into the mapping table as one combined unit such that the vtype and the vl are reduced to a single entry. In implementations, the method further includes wherein the respective tag is liberated in a program order.

The described methods and systems for using renamed registers to support multiple vector instructions includes a method for renaming architectural register. The method includes decoding one or more instructions in a pipeline, wherein the one or more instructions update a control and status register (CSR) including a vector type register (vtype) and vector length register (vl), allocating, based on the one or more instructions, a register entry of the CSR into a first in, first out (FIFO) queue, updating the register entry based on a respective instruction of the one or more instructions, and deallocating, when the respective instruction of the one or more instructions retire from the pipeline, the register entry.

In implementations, the allocating is managed by an allocation pointer that points to a next register entry to be allocated. In implementations, the deallocating is managed by a retirement pointer to point to a next register entry to be retired. In implementations, the method further includes allocating, using a virtual bit, a virtual index to the FIFO queue. In implementations, the method further includes writing an updated value of an updated register entry to an integer register file.

The described methods and systems for using renamed registers to support multiple vector instructions includes a non-transitory computer readable medium comprising a circuit representation that, when processed by a computer, is used to program or manufacture an integrated circuit including a processor including circuitry. The processor and circuitry configured to decode one or more instructions in a pipeline, wherein the one or more instructions update a control and status register (CSR), update values in the CSR, allocate one or more tags to the respective instruction in pipeline, where the one or more tags identify the CSR included in or associated with the one or more instructions or the updated values of the CSR, and where each of the one or more tags is associated with a unique value, and write the tags into a mapping table for renaming the CSR.

In implementations, the CSR includes a vector type register (vtype) and a vector length register (vl). In implementations, the processor including circuitry further configured to when a respective instruction of one or more instructions that overwrote a respective tag retires from the pipeline, liberate the respective tag. In implementations, the respective tag is liberated in an order that is different from an allocated order. In implementations, the one or more types of instructions are of a same type instruction and the vtype and the vl are updated by the same type instruction. In implementations, to write the tags into the mapping table for renaming the CSR includes to write the vtype and the vl into the mapping table as one combined unit such that the vtype and the vl are reduced to a single entry. In implementations, the respective tag is liberated in a program order. In implementations, an entry of the CSR is held in a first in, first out (FIFO) queue before the values of the CSR is updated, and the processor including circuitry is further configured to allocate, using a virtual bit, a virtual index to the FIFO queue.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method for renaming architectural register, comprising:
   decoding one or more instructions in a pipeline, wherein the one or more instructions update a control and status register (CSR), wherein the one or more instructions are of a same type, and the CSR includes a first register and a second register;
   updating values in the CSR based on a respective instruction of the one or more instructions;
   allocating one or more tags to the respective instruction in the pipeline,
      wherein the one or more tags identify the CSR included in or associated with the one or more instructions or the updated values of the CSR, and
      wherein each of the one or more tags is associated with a unique value; and
   writing, for renaming the CSR, values of the first register and the second register into a mapping table as one combined unit such that the values of the first register and the second register are reduced to a single entry.

2. The method of claim 1, wherein the first register is a vector type register (vtype) and the second register is a vector length register (vl).

3. The method of claim 2, further comprising:
   when a respective instruction of the one or more instructions that overwrote a respective tag retires from the pipeline, liberating the respective tag.

4. The method of claim 3, wherein the respective tag is liberated in an order that is different from an allocated order.

5. The method of claim 3, further comprising:
   wherein the respective tag is liberated in a program order.

6. A method for renaming architectural register, comprising:
   decoding one or more instructions in a pipeline, wherein the one or more instructions update a control and status register (CSR) including a vector type register (vtype) and vector length register (vl);
   allocating, based on the one or more instructions, a register entry of the CSR into a first in, first out (FIFO) queue;
   updating the register entry based on a respective instruction of the one or more instructions; and
   deallocating, when the respective instruction of the one or more instructions retire from the pipeline, the register entry.

7. The method of claim 6, wherein the allocating is managed by an allocation pointer that points to a next register entry to be allocated.

8. The method of claim 6, wherein the deallocating is managed by a retirement pointer to point to a next register entry to be retired.

9. The method of claim 8, further comprising:
   allocating, using a virtual bit, a virtual index to the FIFO queue.

10. The method of claim 6, further comprising:
    writing an updated value of an updated register entry to an integer register file.

11. A non-transitory computer readable medium comprising a circuit representation that, when processed by a computer, is used to program or manufacture an integrated circuit comprising:
    a processor including circuitry configured to:
       decode one or more instructions in a pipeline, wherein the one or more instructions update a control and status register (CSR), wherein the one or more instructions are of a same type, and the CSR includes a first register and a second register;
       update values in the CSR;
       allocate one or more tags to the respective instruction in pipeline,
          wherein the one or more tags identify the CSR included in or associated with the one or more instructions or the updated values of the CSR, and
          wherein each of the one or more tags is associated with a unique value; and
       writing, for renaming the CSR, values of the first register and the second register into a mapping table as one combined unit such that the values of the first register and the second register are reduced to a single entry.

12. The non-transitory computer readable medium of claim 11, wherein the first register is a vector type register (vtype) and the second register is a vector length register (vl).

13. The non-transitory computer readable medium of claim 12, wherein the processor including circuitry is further configured to:
    when a respective instruction of one or more instructions that overwrote a respective tag retires from the pipeline, liberate the respective tag.

14. The non-transitory computer readable medium of claim 13, wherein the respective tag is liberated in an order that is different from an allocated order.

15. The non-transitory computer readable medium of claim 13, wherein the respective tag is liberated in a program order.

16. The non-transitory computer readable medium of claim 13, wherein:
    an entry of the CSR is held in a first in, first out (FIFO) queue before the values of the CSR is updated; and
    the processor including circuitry is further configured to allocate, using a virtual bit, a virtual index to the FIFO queue.

* * * * *